United States Patent
Thakkar et al.

(10) Patent No.: US 12,335,309 B2
(45) Date of Patent: Jun. 17, 2025

(54) ENHANCED PROCESSING FOR IPSEC STREAM

(71) Applicant: Nokia Solutions and Networks Oy, Espoo (FI)

(72) Inventors: Gaurang Suryakant Thakkar, Bangalore (IN); Amrit Singh Chandok, Bangalore (IN); Govind Rajaguri, Vidyaranyapura (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 605 days.

(21) Appl. No.: 17/689,385

(22) Filed: Mar. 8, 2022

(65) Prior Publication Data

US 2022/0303310 A1   Sep. 22, 2022

(30) Foreign Application Priority Data

Mar. 16, 2021 (FI) ...................................... 20215284

(51) Int. Cl.
*H04L 9/40* (2022.01)
*H04L 45/745* (2022.01)

(52) U.S. Cl.
CPC .......... *H04L 63/164* (2013.01); *H04L 45/745* (2013.01)

(58) Field of Classification Search
CPC ............... H04L 63/0485; H04L 63/164; H04L 63/0272; H04L 63/0428; H04L 63/12; H04L 63/16; H04L 45/745; G06F 21/72; G06F 9/5027

See application file for complete search history.

(56) References Cited

U.S. PATENT DOCUMENTS

| | | | |
|---|---|---|---|
| 6,708,218 B1 | 3/2004 | Ellington, Jr. et al. | |
| 7,434,045 B1 | 10/2008 | Enderwick et al. | |
| 7,624,263 B1 | 11/2009 | Viswanath et al. | |
| 8,191,134 B1 * | 5/2012 | Thangavelu | H04L 63/0485 726/8 |
| 10,721,097 B2 | 7/2020 | Nandoori et al. | |

(Continued)

FOREIGN PATENT DOCUMENTS

| | | |
|---|---|---|
| CN | 103597798 A | 2/2014 |
| CN | 104247367 A | 12/2014 |

(Continued)

OTHER PUBLICATIONS

Office action received for corresponding Chinese Patent Application No. 202210253802.8, dated Feb. 8, 2024, 7 pages of office action and no page of translation available.

(Continued)

*Primary Examiner* — Brian F Shaw
(74) *Attorney, Agent, or Firm* — Lippes Mathias LLP

(57) ABSTRACT

Embodiments of the present disclosure relate to a method, apparatus and computer readable storage media for processing an Internet Protocol Security (IPsec) stream. A method comprises determining a security association for an incoming stream, the incoming streaming comprising a plurality of packets; performing pre-processing on the plurality of packets based on the security association; and in response to the pre-processing being performed on at least one of the plurality of packets, performing parallel processing on the at least one of the plurality of packets.

17 Claims, 13 Drawing Sheets

(56) References Cited

U.S. PATENT DOCUMENTS

| | | |
|---|---|---|
| 2004/0039936 A1 | 2/2004 | Lai |
| 2004/0205332 A1 | 10/2004 | Bouchard et al. |
| 2006/0056406 A1 | 3/2006 | Bouchard et al. |
| 2010/0268935 A1 | 10/2010 | Rodgers et al. |
| 2013/0263249 A1 | 10/2013 | Song et al. |
| 2014/0281530 A1 | 9/2014 | Song et al. |
| 2015/0355946 A1 | 12/2015 | Kang |
| 2018/0019976 A1 | 1/2018 | Ben-Shalom et al. |
| 2019/0372948 A1 | 12/2019 | Varghese et al. |
| 2020/0280548 A1 | 9/2020 | Toonk et al. |

FOREIGN PATENT DOCUMENTS

| | | | |
|---|---|---|---|
| EP | 1192781 A2 | 4/2002 | |
| GB | 2571576 A * | 9/2019 | ........... H04L 1/1642 |
| WO | 01/05086 A2 | 1/2001 | |
| WO | 01/05087 A2 | 1/2001 | |
| WO | 2018/234849 A1 | 12/2018 | |

OTHER PUBLICATIONS

Kent, "IP Encapsulating Security Payload (ESP)", RFC 4303, Network Working Group, Dec. 2005, pp. 1-44.

Kent, "IP Encapsulating Security Payload (ESP)", RFC 4302, Network Working Group, Dec. 2005, pp. 1-34.

"3rd Generation Partnership Project; Technical Specification Group Services and System Aspects; 3GPP System Architecture Evolution (SAE); Security architecture (Release 16)", 3GPP TS 33.401, V16.3.0, Jul. 2020, pp. 1-170.

Kent et al., "Security Architecture for the Internet Protocol", RFC 4301, Network Working Group, Dec. 2005, pp. 1-101.

"Event Device Library", DPDK Tools User Guides, Retrieved on Mar. 2, 2022, Webpage available at : https://doc.dpdk.org/guides/prog_guide/eventdev.html.

Liu et al., "Design and Implementation of High Performance IPSec Applications with Multi-Core Processors", International Seminar on Future Information Technology and Management Engineering, Nov. 20, 2008, pp. 595-598.

Moore et al., "A high-speed key exchange multi-core SoC architecture for IPSec real-time Internet traffic", IEEE Globecom Workshops, Dec. 6-10, 2010, pp. 903-907.

Office action received for corresponding Finnish Patent Application No. 20215284, dated Aug. 27, 2021, 9 pages.

Vajaranta et al., "Feasibility of FPGA accelerated IPsec on cloud", Microprocessors and Microsystems, vol. 71, No. 2, 2019, pp. 1-10.

Office action received for corresponding Finnish Patent Application No. 20215284, dated Feb. 3, 2022, 8 pages.

Extended European Search Report received for corresponding European Patent Application No. 22160549.6, dated Jul. 26, 2022, 7 pages.

Office action received for corresponding Chinese Patent Application No. 202210253802.8, dated Jul. 27, 2024, 5 pages of office action and 5 pages of translation available.

* cited by examiner

ENHANCED PROCESSING FOR IPSEC STREAM

TECHNICAL FIELD

Embodiments of the present disclosure generally relate to the field of telecommunication, and in particular, to an apparatus, method and computer readable storage media for processing an Internet Protocol Security (IPsec) stream.

BACKGROUND

IPsec is a secure network protocol suite that authenticates and encrypts data packets to provide secure encrypted communication between two entities over an Internet Protocol network. IPsec can be used to create site-to-site IPsec tunnels. According to a technical specification of the 3rd Generation Partnership Project (3GPP), a Base Transceiver Stations (BTS) and a Serving Gateway (S-GW) transfer data packets of a user plane over the IPsec tunnels. Standards for IPsec are described in Internet Engineering Task Force (IETF) Request for Comments (RFC)-4301, RFC-4303 and its family of RFC. Transferring data packets over the IPsec tunnels according to the standards should be efficient and optimized in order to support the high throughput of 5G communication system, for example, the required throughput of tens of Giga bits per second.

SUMMARY

In general, example embodiments of the present disclosure provide apparatuses, methods and computer readable storage media for processing an IPsec stream.

In a first aspect, there is provided an apparatus. The apparatus comprises at least one processor; and at least one memory including computer program codes; the at least one memory and the computer program codes are configured to, with the at least one processor, cause the apparatus to determine a security association for an incoming stream, the incoming streaming comprising a plurality of packets; perform pre-processing on the plurality of packets based on the security association; and in response to the pre-processing being performed on at least one of the plurality of packets, perform parallel processing on the at least one of the plurality of packets.

In a second aspect, there is provided a method. The method comprises determining a security association for an incoming stream, the incoming streaming comprising a plurality of packets; performing pre-processing on the plurality of packets based on the security association; and in response to the pre-processing being performed on at least one of the plurality of packets, performing parallel processing on the at least one of the plurality of packets.

In a third aspect, there is provided an apparatus comprising: means for determining a security association for an incoming stream, the incoming streaming comprising a plurality of packets; means for performing pre-processing on the plurality of packets based on the security association; and means for in response to the pre-processing being performed on at least one of the plurality of packets, performing parallel processing on the at least one of the plurality of packets.

In a fourth aspect, there is provided a non-transitory computer readable medium comprising program instructions for causing an apparatus to perform at least the method according to the above second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
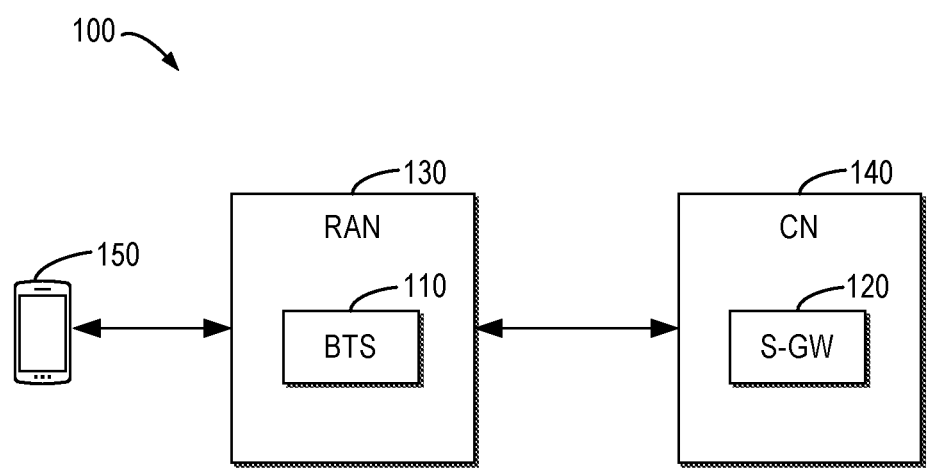
FIG. 1 illustrates a block diagram of an example environment in which some example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay node, a low power node such as a femto, a pico, and so forth, depending on the applied terminology and technology. An example of the relay node may be an Integrated Access and Backhaul (IAB) node. A distributed unit (DU) part of the IAB node may perform the functionalities of "network device" and thus can operate as the network device. In the following description, the terms "network device", "BS", and "node" may be used interchangeably.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a relay node, a device operating on commercial and/or industrial wireless networks, and the like. A Mobile Termination (MT) part of the IAB node may perform the functionalities of "terminal device" and thus can operate as the terminal device. In the following description, the terms "terminal device", "communication device", "terminal", "user equipment" and "UE" may be used interchangeably.

As used herein, the term "IPsec stream" refers to a data stream protected by IPsec. A packet of an IPsec stream is also referred to as an "IPsec packet". Similarly, the term "non-IPsec stream" refers to a data stream which is not protected by IPsec. A packet of a non-IPsec stream is also referred to as a "non-IPsec packet".

Example Environment and Working Principle

FIG. 1 illustrates an example environment 100 in which some example embodiments of the present disclosure can be implemented. As shown in FIG. 1, the environment 100 includes a terminal device 150, a radio access network (RAN) 130 and a core network (CN) 140. It is also to be understood that the example environment 100 is shown only for the purpose of illustration, without suggesting any limitation to the scope of the present disclosure. Embodiments of the present disclosure may also be applied to an environment with a different structure.

Each of the RAN 130 and the CN 140 may include network devices or elements. As shown in FIG. 1, the RAN 130 includes a Base Transceiver Station (BTS) 110 and the CN 140 includes a serving gateway (S-GW) 120. Some of the network devices or elements may need to process IPsec streams. As an example, the BTS 110 needs to process the IPsec streams in both uplink (UL) direction and downlink (DL) direction.

In the UL direction, the BTS 110 receives plain packets (for example, from the terminal device 150), converts the plain packets to encrypted packets and sends the encrypted packets over an IPsec tunnel to the S-GW 120. In the DL direction, the BTS 110 receives encrypted IPsec packets from the S-GW 120. The encrypted IPsec packets are decrypted and converted to plain packets and processed further.

Figure 2A:
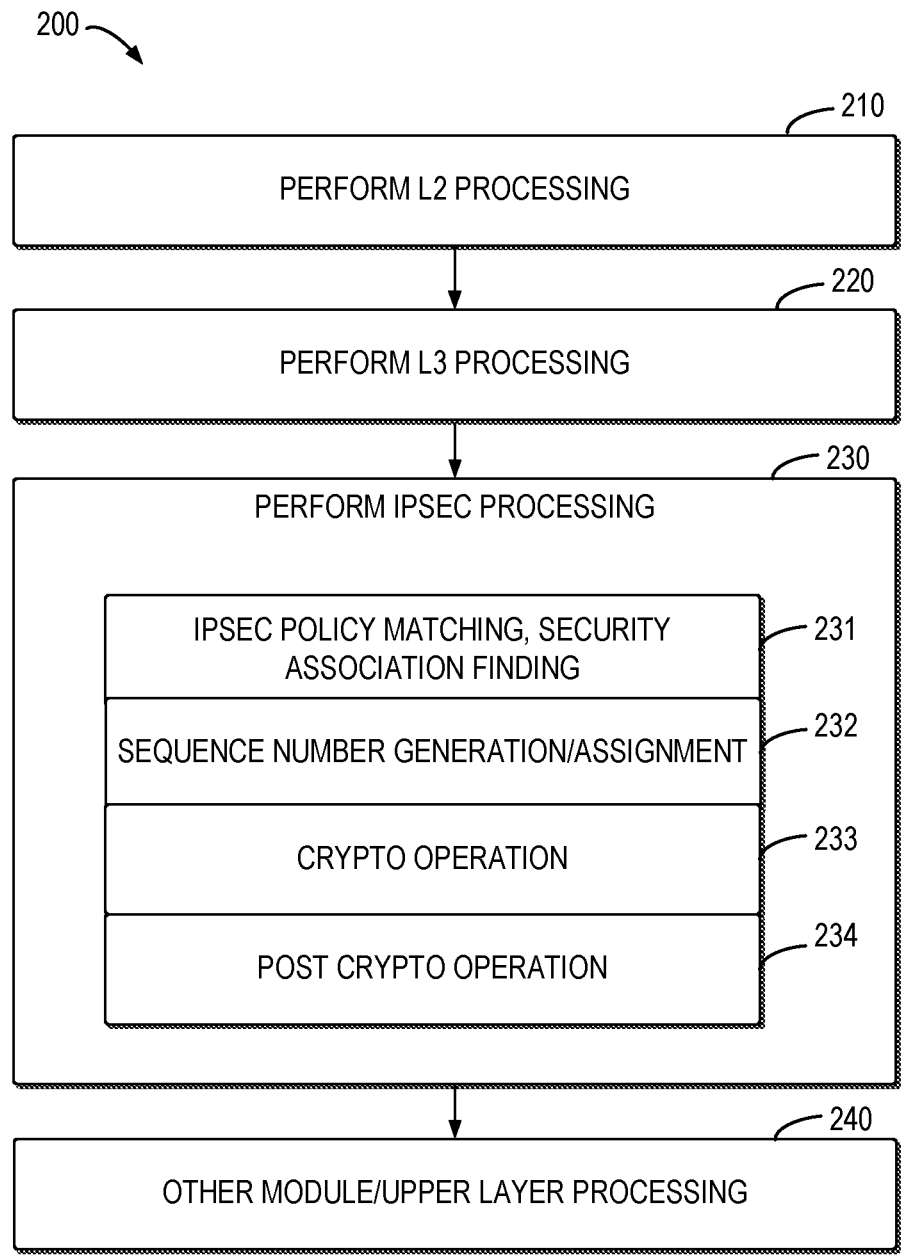
FIG. 2A illustrates a flowchart of an example process for processing an IPsec stream in case of encryption.

FIG. 2A illustrates a flowchart of an example process 200 for processing an IPsec stream in the case of encryption. An IPsec packet of the IPsec stream is received via for example a network interface card (NIC) or a receiver (RX). Then, at 210, Layer 2 (L2) processing is performed on the IPsec packet. At 220, Layer 3 (L3) processing is performed on the IPsec packet. At 230, IPsec processing is performed on the IPsec packet. As shown in FIG. 2A, the IPsec processing at 230 may comprise IPsec policy matching and security association (SA) finding at 231, sequence number generation/assignment at 232, a crypto operation at 233 and a post crypto operation at 234. At 240, other module/upper layer processing is performed on the IPsec packet. Then, the processed IPsec packet is ready for transmission for example via a transmitter (TX).

Figure 2B:
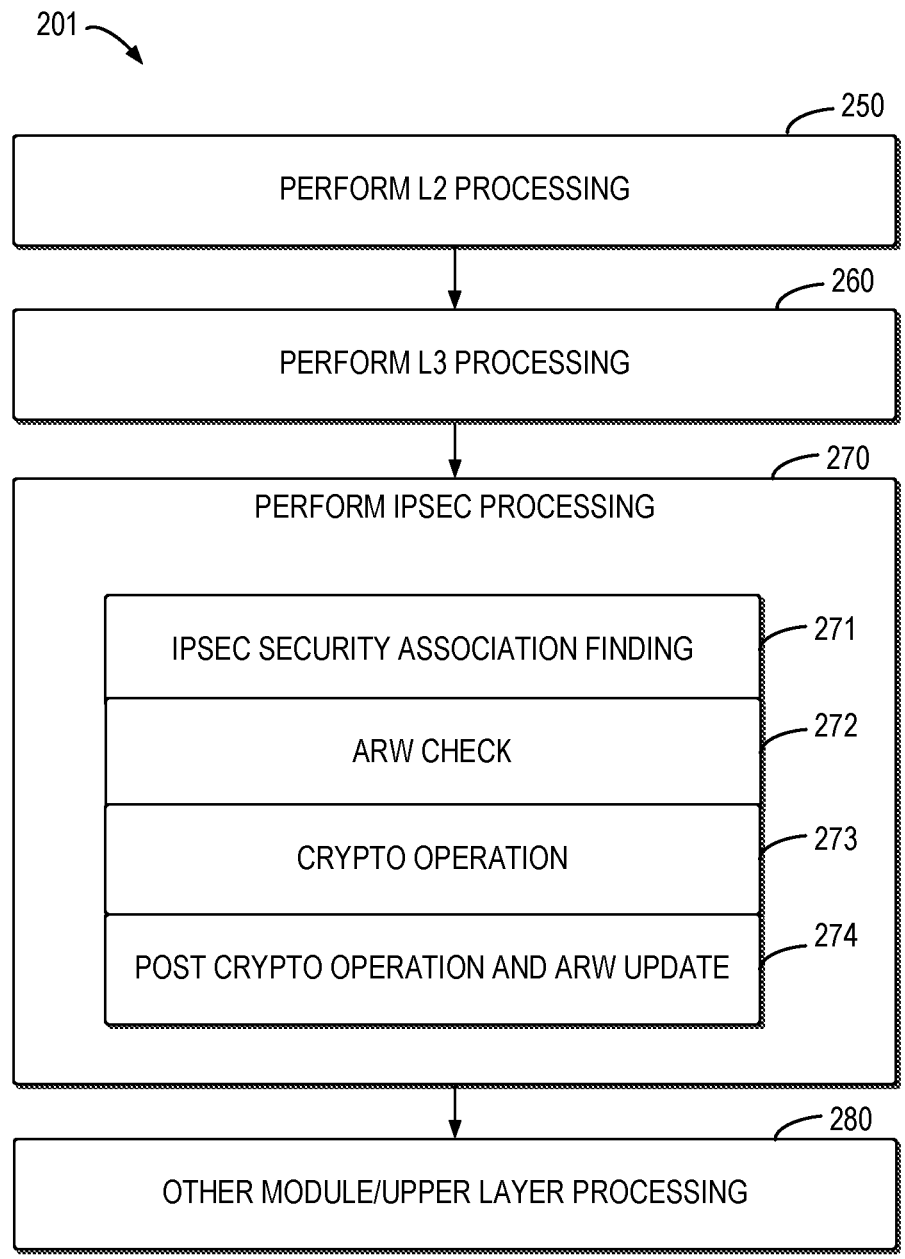
FIG. 2B illustrates a flowchart of an example process for processing an IPsec stream in case of decryption.

FIG. 2B illustrates a flowchart of an example process 201 for processing an IPsec stream in the case of decryption. An IPsec packet of the IPsec stream is received via for example a NIC or a RX. Then, at 250, L2 processing is performed on the IPsec packet. At 260, L3 processing is performed on the IPsec packet. At 270, IPsec processing is performed on the IPsec packet. As shown in FIG. 2B, the IPsec processing at 270 may comprise IPsec security association finding at 271, anti-replay window (ARW) check at 272, a crypto operation at 273, and a post crypto operation and ARW update at 274. At 280, other module/upper layer processing is performed on the IPsec packet. Then, the processed IPsec packet is ready for transmission for example via a TX.

Implementation of the above processes 200 and 201 on a single central processing unit (CPU) core is not able to handle the high throughput requirement of 5G system. Thus, multiple CPU cores are used to perform parallel processing of IPsec packets. When implementing the processes 200 and 201 on multiple CPU cores, there are majorly three sub-processes where synchronization is needed between the cores. In the case of encryption, synchronization between the cores is needed for sequence number generation/assignment at 232. In the case of decryption, synchronization between the cores is needed for ARW check at 272 and ARW update at 274. In the following, ARW check and ARW update may be collectively referred to as "ARW processing".

As such, when multiple CPU cores perform processing of IPsec packets in parallel, it poses challenges in terms of synchronization of execution and integrity protection of shared resources/data structures. There are two major conventional solutions for implementation on multiple CPU-cores.

Figure 3:
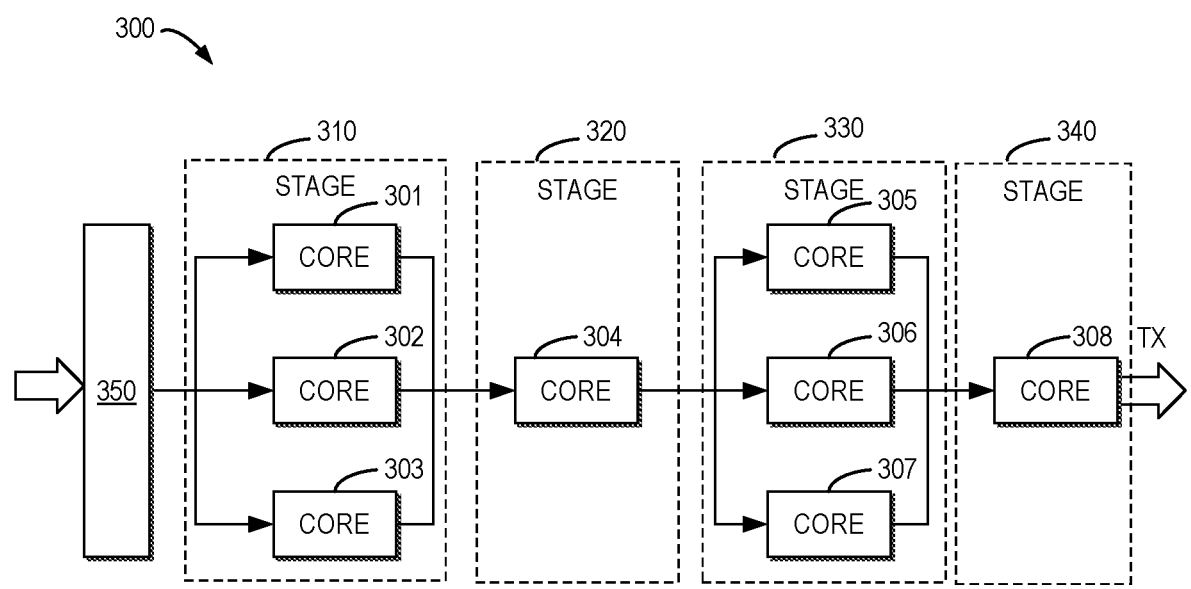
FIG. 3 illustrates a block diagram of a staging approach for processing an IPsec stream.

Staging approach is a well-known conventional solution. FIG. 3 illustrates a block diagram 300 of a staging approach for processing packets of an IPsec stream. In the staging approach, upon receiving packets via an input interface 350, the overall packet processing is divided into multiple parts called stages, for example, stages 310, 320, 330 and 340 as shown in FIG. 3. In this approach, stages 310, 320, 330 and 340 could be executed in either a parallel manner or an atomic manner. As shown in FIG. 3, stages 310 and 330 are executed in the parallel manner by cores 301, 302, 303 and cores 305, 306, 307, respectively. Stages 320 and 340 are executed in the atomic manner by a core 304 and a core 308, respectively.

At the point of synchronization, packets are converged into the stages 320 and 340 executed in the atomic manner where execution becomes single threaded. It protects integrity of shared resources/data structures. Since packet processing is divided into multiple stages, packets switch between CPU cores for processing. Switch of a packet from a source CPU core to a destination CPU core causes the destination CPU core to reload the packet into its cache memory. Currently, as modern CPU cores have evolved to be more efficient, memory access is becoming the limiting factor for performance centric programs. Reload of the packet into cache memory at each stage worsens this bottleneck of memory access. The higher number of stages, the lower execution efficiency, resulting in higher drop of overall throughput. Therefore, the staging approach suffers from Packet reload in memory at each stage of execution, less efficient utilization of CPU cache memory as well as less throughput.

Run to completion with locks, which is also referred to as "RtC with Locking" is another well-known conventional solution. In this solution, packet execution is kept bound to a single CPU core throughout the processing. Parallel execution on multiple CPU cores must use synchronization mechanism such as spinlock to protect integrity of shared resources. Though RtC with Locking avoids losing CPU cache memory benefit which is lost in the staging approach, locking comes at a very high cost. The lock acquired by one thread/core would stall the other threads/cores from further execution until the lock is released. This poses extremely high performance-penalty. Performance penalty increases with the increase in the number of contending CPU cores for the same lock. Due to this drawback, after adding a few CPU cores, adding an extra CPU core to help achieve more throughput, does not add desired throughput.

Table 1 shows test results for the RtC with Locking approach when extra CPU cores are added. As can be seen from Table 1, the RtC with Locking approach is a Non-Scalable solution.

TABLE 1

Throughputs achieved using the RtC with Locking approach

| No. of CPU cores used for processing | RtC with Locking Total Throughput (Gbps) | Scaling achieved for last added CPU core(Gbps) |
|---|---|---|
| 2 | 8.24 | — |
| 3 | 11.78 | 3.54 |
| 4 | 14.48 | 2.7 |
| 5 | 16.81 | 1.93 |

As mentioned above, the 5G communication system requires a high throughput. For example, a rate of user plane traffic between the BTS and the S-GW is in the order of gigabits (>15 Gbps) and is expected to grow up to 50 Gbps or larger. Hence, it is needed to have a highly efficient and scalable solution for processing the IPsec stream. In this situation, if the conventional solutions such as the staging approach or the RtC with Locking approach on multiple CPU cores were employed, each approach would pose highly undesirable drawbacks. If the staging approach was employed, it would result in a lower throughput due to packet switching between CPU-cores and loosing on CPU-core cache memory benefits. If the RtC with Locking approach was employed, the throughput would not scale linearly with each added CPU core due to the increased locking contention. It is desired to have a solution which avoids the above drawbacks.

In addition to the two conventional solutions, other solutions including hardware based solutions and software based solutions are proposed. The hardware based solutions use dedicated hardware for example implemented in System on Chip (SoC). Although processing the IPsec stream in dedicated hardware helps in performance improvement, scalability is limited by systemic opportunities for pipelining and fast/zero copy memory operations within the hardware. Moreover, as another drawback, the dedicated hardware cannot help in case of Cloud Deployment on commodity hardware or GPUs. The software based solutions fail to achieve both high throughput and linear scaling.

In view of the foregoing, a standard compliant solution is needed to solve at least one of the above problems and other potential problem. Such a solution can utilize parallel, multiple CPU-cores processing, does not involve packets hopping from one core to another core and avoids use of locks (for sequence number generation and ARW processing), resulting in higher throughput efficiently with linear scalability.

Embodiments of the present disclosure provide a solution for processing an IPsec stream. In this solution, a SA for an incoming stream comprising a plurality of packets is determined at a pre-processing module. Pre-processing is performed on the plurality of packets based on the security association at the pre-processing module. For different types of packets, different pre-processing is performed. In the case of an outbound packet, sequence number generation and assignment based on the SA, which was otherwise performed by a processing core later while performing IPsec processing after L2 and L3 processing, is performed on the outbound packet at the pre-processing module. In the case of an inbound packet, ARW check which was otherwise performed by a processing core while handling decryption and ARW update which was otherwise performed by a processing core after performing Integrity Check Verification (ICV) are performed on the inbound packet at the pre-processing module.

After the pre-processing is performed on at least one of the plurality of packets, the pre-processed packets are distributed to a respective processing core of a parallel processing module. At the parallel processing module, parallel processing is performed on the pre-processed packets. Since the SA for the incoming stream is determined at the pre-processing module and the pre-processing is performed on the packets of the incoming stream based on the SA, the need for locking, atomic operations and staging as required by the conventional solutions is eliminated at the parallel processing module. Therefore, the parallel processing on the packets of the incoming stream is lockless.

According to the example embodiments of the present disclosure, several advantages can be achieved. In an aspect, packets of the incoming stream are pre-processed based on the SA before parallel processing. As such, the parallel processing is lockless and, the need for synchronization and atomic operations are avoided. In this way, scalability can be achieved. In another aspect, with the pre-processing based on the SA, carefully avoids staging and hopping can be avoided, and a packet can stick to a single core throughout the execution of IPsec processing. In this way, utilization of cache memory can be optimized and a higher throughput can be achieved. In a further aspect, the example embodiments of the present disclosure can entirely be implemented in software and hence can be utilized in Cloud deployments as well.

In still a further aspect, the example embodiments of the present disclosure can achieve high throughput and scalability without relying on any deviation from the standards for IPsec. Therefore, a completely standard compliant solution is possible and can inter operate with 3rd party products. In yet a further aspect, the example embodiments of the present disclosure do not limit a particular packet to any particular CPU-core. All the packets could be distributed to any/ multiple cores. In this way, an Integrated Access and Backhaul (IAB) use case of high flow within an SA can be handled as well.

Example Apparatus and Methods

More details of the example embodiments in accordance with the present disclosure will be described with reference to FIGS. 4-8. The above aspects and other aspects of the present disclosure will become apparent from the following description.

Figure 4:
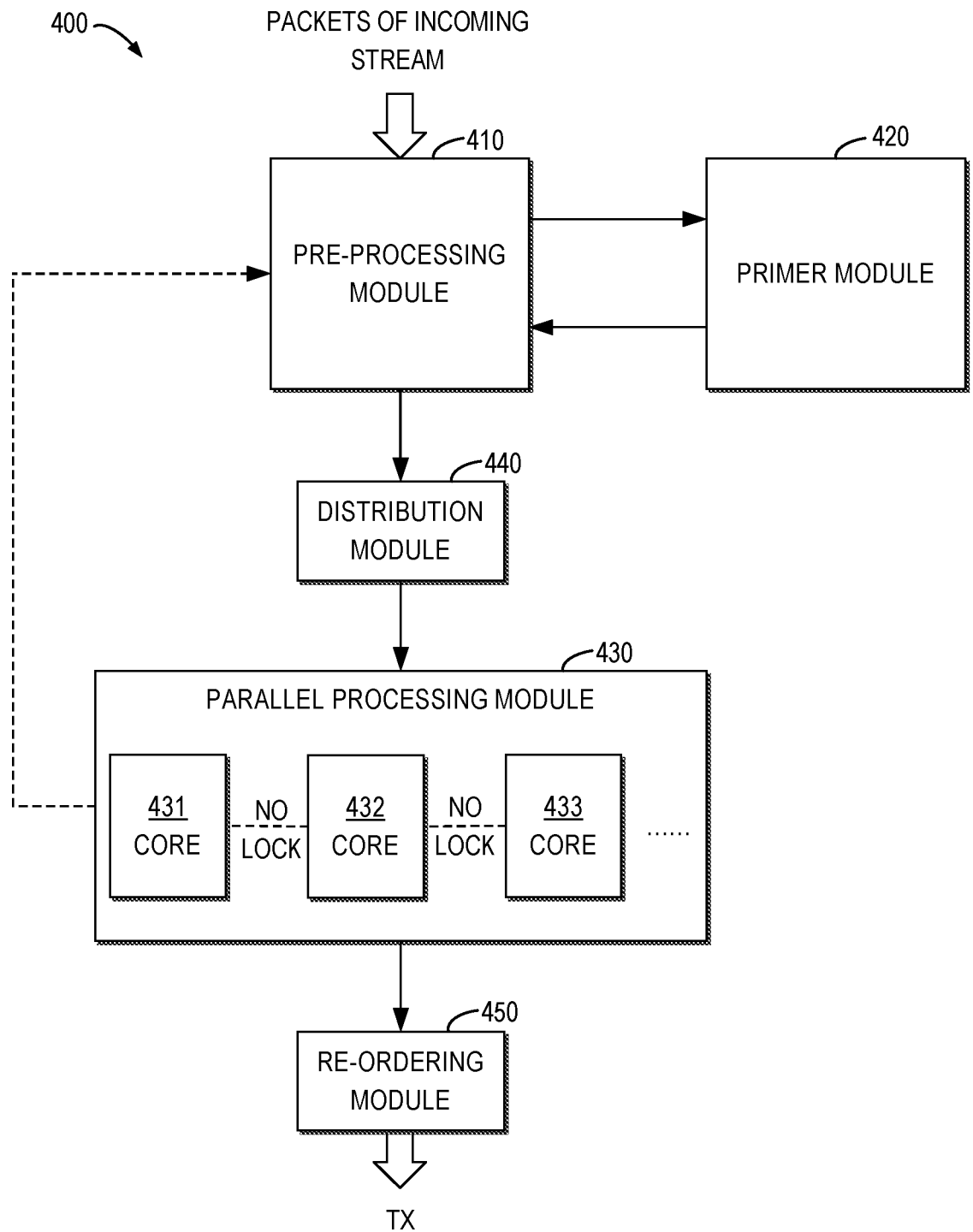
FIG. 4 illustrates a simplified block diagram of an apparatus for processing an IPsec stream according to some example embodiments of the present disclosure.

FIG. 4 illustrates a simplified block diagram of an example apparatus 400 for processing an IPsec stream according to some example embodiments of the present disclosure. In general, the apparatus 400 comprises a pre-processing module 410, a primer module 420, a parallel preprocessing module 430, a distribution module 440 and a re-ordering module 450.

An incoming stream comprises a plurality of packets. The pre-processing module 410 receives packets of the incoming stream from an input source, for example, an NIC, a physical function (PF), Virtual Function (VF) or a host. The pre-processing module 410 is configured to determine an SA for the incoming stream and pre-process the packets of the incoming stream based on the SA.

To this end, the pre-processing module 410 may implement functions of determining the SA, assigning a sequence number to an outbound packet based on the determined SA and performing ARW processing on an inbound packet based on the determined SA. As will be seen from the methods described below, the main intention of the pre-processing module 410 is to quickly map the incoming stream to a pre-learnt SA for sequence number assignment or ARW processing and direct packets of the incoming stream to the next module in the apparatus 400.

The pre-processing module 410 can be implemented on multiple cores and need not be restricted to a single core. Alternatively, the pre-processing module 410 can also be implemented as part of hardware, for example, a SoC.

In some example embodiments, in order to determine the SA for the incoming stream, the pre-processing module 410 may interact with the primer module 420. The primer module 420 is used to assist the pre-processing module 410 in determining the SA for a new incoming stream. As used herein, a new incoming stream is referred to as a stream which is not pre-processed by the pre-processing module 410 previously.

Once the packets of the incoming stream are pre-processed at the pre-processing module 410, the pre-processed packets are sent to the distribution module 440. The distribution module 440, for example, a scheduler, is configured to distribute the pre-processed packets to processing cores of the parallel processing module 430.

The parallel processing module 430 comprises a plurality of processing cores, which are referred to as "cores" for short. FIG. 4 shows cores 431, 432 and 433 as examples. Since operations requiring synchronization are performed at the pre-processing module 410, processing at different cores of the parallel processing module 430 is independent and thus cores of the parallel processing module 430 can be lockless. The regular L2 processing, L3 processing, remaining part of the IPsec processing except for the sequence number generation or ARW processing is performed in each of these cores. As such, as part of the IPsec processing, the remaining SA lookup, IPsec crypto processing including encryption/decryption and post crypto operations remain the same. Since there are no locks or atomic stages, addition of more cores produces a linear increase in throughput results.

Upon completion of the parallel processing by the cores, the packets may be sent to a re-ordering module 450. The re-ordering module 450 is configured to re-order the packets by using any suitable packet ordering methodologies. As such, the re-ordered packets are ready for transmission.

It is to be understood that the modules as shown in FIG. 4 are for the purpose of illustration without any limitation to the protection scope. Some of the modules, for example, the distribution module 440 and the re-ordering module 450 may be omitted or integrated with another module. Moreover, the apparatus 400 may comprise modules or functions not shown.

The apparatus 400 can be used in network elements, for example, a base station (e.g., eNodeB, gNodeB) and a cloud RAN (e.g., CU and DU). As an example, the apparatus can be implemented at the BTS 110 or the S-GW 120 as shown in FIG. 1. The apparatus 400 can also be used for any generic network function providing security gateway functionality, e.g. a router, a User Plane Function providing IPsec Gateway.

Figure 5:
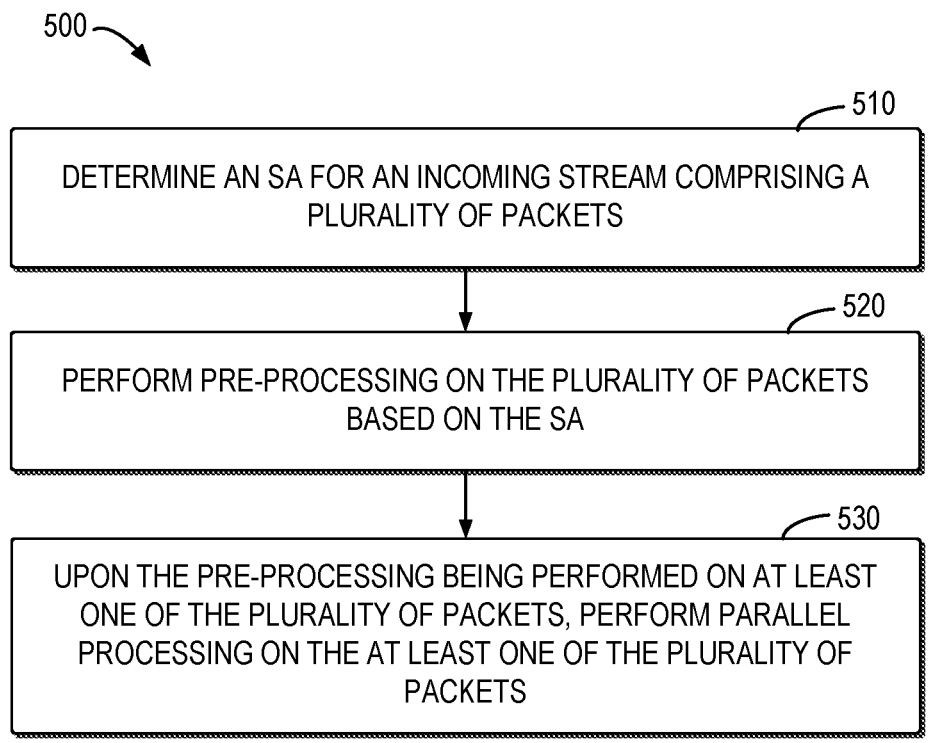
FIG. 5 illustrates a flowchart of an example method for processing an IPsec stream according to some example embodiments of the present disclosure.

Reference is now made to FIG. 5. FIG. 5 illustrates a flowchart of an example method 500 for processing an IPsec stream according to some example embodiments of the present disclosure. The method 500 can be implemented at any suitable device, for example the apparatus 400 as shown in FIG. 4. For the purpose of illustration, It is to be understood that the method 500 may include additional blocks not shown and/or may omit some shown blocks, and the scope of the present disclosure is not limited in this regard.

At block 510, an SA for an incoming stream comprising a plurality of packets is determined. For example, upon receiving one or more packets of the incoming stream, the pre-processing module 410 may determine the SA for the incoming stream. In some example embodiments, the pre-processing module 410 may determine the SA by a normal SA finding procedure.

In some example embodiments, the pre-processing module 410 may maintain or utilize a table which stores mapping information between an IPsec stream and a predetermined SA. This table may be referred to as a "first table" or "whitelist table". In such example embodiments, upon receiving the packets of the incoming stream, the pre-processing module 410 may look up the whitelist table to find out a predetermined SA for the incoming stream. The whitelist table is dynamically populated and can store the mapping information in any suitable manner.

As an example, the whitelist table may be implemented as a hash table. The whitelist table may store information indicating the mapping of Receiving Side Scaling (RSS) Hash values of IPsec streams to associated SA references. As used herein, the term "SA reference" refers to an index or an identifier for a particular SA. In this situation, the RSS Hash value of each of the received packets is used as a key to the whitelist table, to quickly find the associated SA reference. If the RSS Hash value corresponds to an entry that comprises more than one SA reference, than an additional lookup based on a value of Security Parameter Index (SPI) may be performed.

Such example embodiments will be described in detail with reference to FIG. 6 below.

After determining the SA, the method 500 proceeds to block 520. At block 520, pre-processing is performed on the plurality of packets based on the SA for the incoming stream. Different pre-processing may be performed on different types of packets.

For a specific packet of the plurality of packets, the pre-processing module 410 may determine whether the specific packet is an outbound packet or an inbound packet. If the specific packet is an outbound packet, a sequence number is generated and assigned to the specific packet based on a sequence number counter of the determined SA. For example, if the SA reference found in the whitelist table is an outbound SA reference, the SA is used to assign the sequence number to the specific packet. The sequence number to be used by the specific packet can be included as part of the metadata of the packet, based on packet processing architecture.

The main intention of pre-assigning the sequence numbers to the packets is to ensure that the packets can be distributed to parallel processing cores. As such, the need for locks or intermediate atomic stages to synchronize the sequence number assignment between the cores is eliminated.

In some example embodiments, the sequence number can be generated by incrementing a value of the sequence number counter of the SA by for example 1. In some example embodiments, the specific packet may needed be divided into fragments in a later stage. Accordingly, the pre-processing module 410 may determine the number of fragments into which the specific packet is to be divided. The number of fragments may be determined based on a size of the specific packet, a packet size available for transmission and the security association (for example, information concerning the encryption overheads). Then, the sequence number can be generated by incrementing a value of the sequence number counter by the number of the fragments.

In such example embodiments, when fragmentation of the specific packet is performed at a later stage in the apparatus 400, the sequence number of the newly created fragments will be sequential increments of the sequence number of the original packet. This ensures that correct sequence number is assigned to the fragmented traffic as well.

If the specific packet is an inbound packet, ARW check is performed based on the SA. The pre-processing module 410 may verify whether the sequence number of the specific packet falls within an ARW of the SA and include a result of the verification in the specific packet. The ARW status may be filled in the metadata of the packet. For example, if the SA reference found in the whitelist table is an inbound SA reference, the SA is used to verify whether the sequence number of the packet is within the ARW of the SA. Depending on a success or failure in the ARW check, the specific packet is marked accordingly.

Additionally, in some example embodiments, the ARW of the SA may be updated based on a feedback from the parallel processing at the parallel processing module 430. For example, feedback messages from individual cores 431, 432 and 433 of the parallel processing module 430 may be enqueued into the pre-processing module 410. The ARW of the SA can be updated based on the feedback messages accordingly. In this way, the cores of the parallel processing module 430 do not have to take locks or be funneled through atomic stages to synchronize the processing.

At block 530, upon the pre-processing being performed on at least one of the plurality of packets, parallel processing is performed on the at least one of the plurality of packets. In other words, once the packets of the incoming stream are pre-processed, the pre-processed packets are sent to the distribution module 440. For example, after sequence number assignment is performed on the outbound packets, the outbound packets can be sent to the distribution module 440. Likewise, after ARW check is performed on inbound packets, the inbound packets can be sent to the distribution module 440. The distribution module 440 distributes the pre-processed packets to processing cores of the parallel processing module 430.

Since the presence of sequence number for the outbound packet or ARW status being prefilled in the metadata of the inbound packets, the sequence number generation or ARW processing, which would have required synchronization across the cores using locks or creation of additional stages, is eliminated at the parallel processing module 430. For the outbound packet, or in other words in the case of encryption flow, the cores 431, 432, 433 may merely copy the sequence number present in the metadata of the packet to the encrypted header and continue with remaining processing. Alternatively, for the inbound packet, or in other words in the case of decryption flow, the cores 431, 432, 433 may drop or continue to process the packet based on the ARW status.

As mentioned above with reference to block 510, in some example embodiments, the pre-processing module 410 may determine the SA by using the whitelist table. Reference is now made to FIG. 6. FIG. 6 illustrates a flowchart of an example method 600 for determining the SA according to some example embodiments of the present disclosure. The method 600 can be considered as a specific implementation of the block 510 of FIG. 5.

At block 610, upon receiving a packet of the incoming stream, the pre-processing module 410 determines, based on the received packet, whether the incoming stream is mapped to at least one predetermined security association indicated in the whitelist table. For example, the RSS hash value of the received packet may be calculated and used as a key to the whitelist table.

If at block 610 it is determined that the incoming stream is mapped to at least one predetermined SA indicated in the whitelist table, the method 600 proceeds to block 620. At block 620, the pre-processing module 410 determines the SA for the incoming stream from the at least one predetermined SA. For example, if the RSS hash value of the packet corresponds to a SA reference in the whitelist table. The SA indicated by the SA reference may be determined as the SA for the incoming stream.

If the whitelist table stores the mapping information between a specific incoming stream and associated SA, the specific incoming stream is a learnt stream. In such example embodiments, processing of packets of the learnt stream can be accelerated by utilizing the whitelist table.

If at block 610 it is determined that the incoming stream is not mapped to any predetermined SA indicated in the whitelist table, the packet is sent from the pre-processing module 410 to the primer module 420. The primer module 420 may determine whether the incoming stream is an IPsec stream or a non-IPsec stream. In other words, the primer module 420 may determine whether the packet is an IPsec packet or a non-IPsec packet.

In some example embodiments, the primer module 420 may maintain a table to indicate non-IPsec streams. Such a table is referred to as "second table" or "backlist table". An entry of the blacklist table indicates a non-IPsec stream. Similar to the whitelist table, the backlist may be implemented as a hash table.

Figure 6:
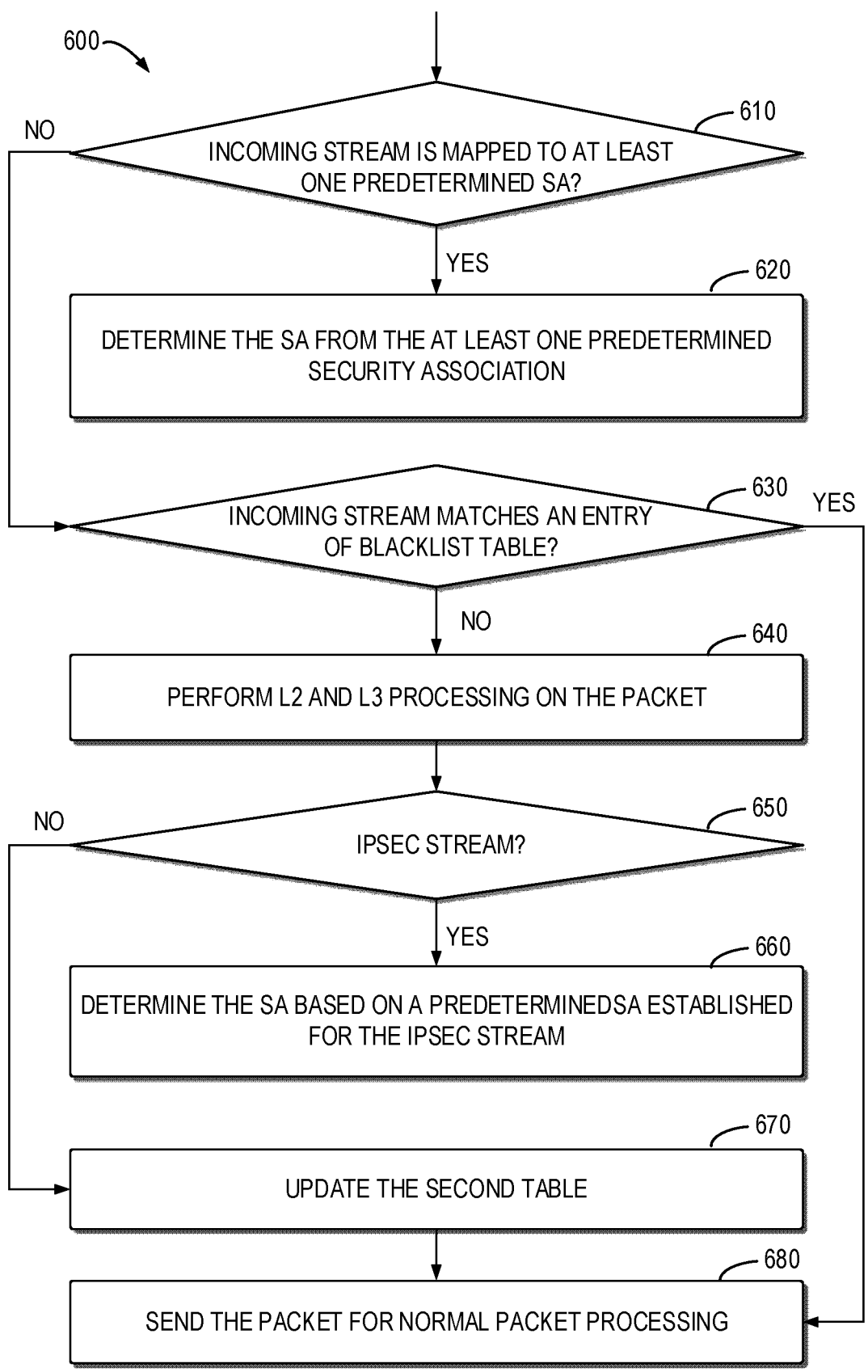
FIG. 6 illustrates a flowchart of an example method for determining a security association according to some example embodiments of the present disclosure.

As shown in FIG. 6, in such example embodiments, the method 600 may proceeds to block 630. At block 630, the primer module 420 determine, based on the packet received from the pre-processing module 410, whether the incoming stream matches an entry of the blacklist table. If at block 630, it is determined that the incoming stream matches an entry of the blacklist table, the method 600 proceeds to block 680. For example, if the hash value of the packet received from the pre-processing module 410 matches an entry of the backlist table, it means that the incoming stream is a non-IPsec stream and thus the packet is identified as a non-IPsec packet. In this situation, the method 600 proceeds to block 680. At block 680, the packet which is a non-IPsec packet is sent out for normal packet processing.

If at block 630, it is determined that the incoming stream matches no entry of the blacklist table, the method 600 proceeds to block 640. For example, if the hash value of the packet received from the pre-processing module 410 matches no entry of the backlist table, it means that whether the incoming stream is a non-IPsec stream or not need to be further determined. In this situation, the method 600 proceeds to block 640.

At block 640, the primer module 420 performs L2 and L3 processing on the packet to determine whether the packet is mapped to an inbound stream or an outbound stream. The L2 and L3 processing includes IPsec policy lookup to determine whether the packet is mapped to an inbound (i.e., decryption) stream or an outbound (i.e., encryption) stream. At block 650, the primer module 420 determines whether the incoming stream is an IPsec stream or a non-IPsec stream. For example, if the packet is mapped to an inbound stream or an outbound stream, the incoming stream is determined as the IPsec stream. If the packet is neither mapped to an inbound stream nor an outbound stream, the incoming stream is determined as the non-IPsec stream.

If at block 650, the incoming stream is determined as the non-IPsec stream, it means that packets of the incoming stream do not need IPsec processing. In this situation, the method 600 proceeds to block 670 and block 680. At block 670, the blacklist table is updated to indicate the incoming stream. As such, subsequent packets of the incoming packet will be identified as a non-IPsec packet at block 630 and will be sent out for normal processing directly.

In such example embodiments, the backlist table is dynamically updated to indicate non-IPsec streams. In this way, a non-IPsec packet which does not need IPsec processing can be quickly identified and the processing at the primer module 420 can be further accelerated. Alternatively, in some example embodiments, the blacklist table may be maintained by the pre-processing module 410.

Continuing with the method 600, if at block 650, the incoming stream is determined as the IPsec stream, it means that packets of the incoming stream need IPsec processing. In this situation, the method 600 proceeds to block 660. At block 660, the primer module 420 determines the SA for the incoming packet based on a predetermined SA established for the IPsec stream. For example, the primer module 420 may find out or retrieve the SA reference for the SA which is created during a negotiation for establishing a secure connection. In other words, if identified as the IPsec stream, depending on the packet being an encryption or a decryption flow, corresponding SA lookup is performed and the associated outbound or inbound SA reference for the incoming stream is identified.

In this situation, metadata of the packet may be updated to include the determined SA reference or information of the SA reference. An additional flag may also be included into the metadata of the packet. The additional flag may indicate that this packet has been sent to the primer module 420 and include SA information of the incoming stream.

Upon completion of block 660, the packet which is the IPsec packet is sent back to the pre-processing module 410. Then, the pre-processing module 410 may updates the whitelist table to store mapping information between the incoming stream and the determined SA. For example, based on the additional flag and the associated SA reference in the metadata of the packet, the whitelist table is updated to store information which maps the RSS hash value of the incoming stream to the associated SA reference. Therefore, the SA to be used for subsequent packets of the same incoming stream can be quickly determined by using the dynamically populated whitelist table. In this way, there is no need to run the primer module 420 again.

In some example embodiments, if more than one packet of the same incoming stream is received, a specific packet (for example, the first packet) of the incoming packet may be sent to the primer module 420. The remaining packets can be buffered in the pre-processing module 410. Once the specific packet (for example, the first packet) is enqueued back after processing at the primer module 420, the remaining buffered packets can be de-queued and mapped to the SA reference. In this way, performance of the pre-processing module 410 can be further optimized.

As can be seen from the above, the primer module 420 is triggered only once per a new IPsec stream. The primer module 420 is used to ensure that the whitelist table is updated with the associated SA references.

It is to be understood that the blocks shown in FIG. 6 are merely for the purpose of illustration. The method for determining the SA may include more or less blocks. In some example embodiments, the backlist table may not be maintained and the block 630 can be omitted. In such example embodiments, if at block 610, it is determined that the incoming stream is not mapped to any predetermined SA indicated in the whitelist table, the method 600 may proceed to block 640. In some example embodiments, the non-IPsec stream may be filtered and not permitted to enter the pre-processing module 410. For example, the apparatus 400 may be dedicated to process IPsec streams. In such example embodiments, blocks 630, 640, 650, 670 and 680 may be omitted.

Figure 7A:
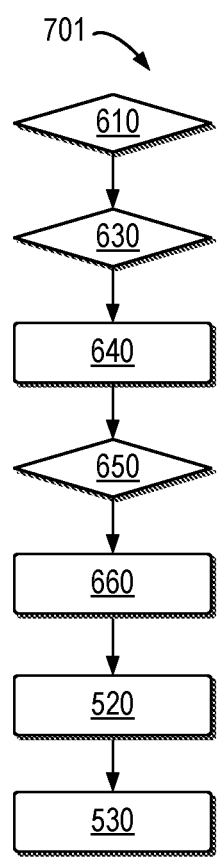
FIG. 7A illustrates a block diagram of a processing flow for a packet of a new IPsec stream according to some example embodiments of the present disclosure.
Figure 7B:
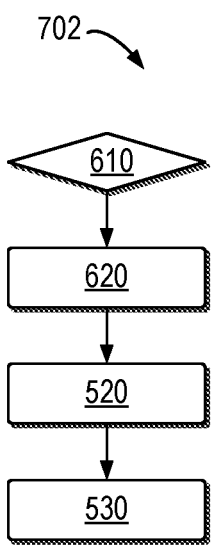
FIG. 7B illustrates a block diagram of a processing flow for a packet of a pre-processed IPsec stream according to some example embodiments of the present disclosure.

Given the above description with reference to FIGS. 5 and 6, processing flows for different packets may be different. FIG. 7A illustrates a block diagram of a processing flow 701 for a packet of a new IPsec stream which has not been pre-processed by the pre-processing module 410. The processing flow 701 occurs in the case where a new IPsec stream enters the apparatus 400 and needs to be learnt via the SA reference discovery, as part of the primer module 420. FIG. 7B illustrates a block diagram of a processing flow 702 for a packet of an IPsec stream which has been pre-processed by the pre-processing module 410. The processing flow 702 occurs in the case where the SA information for the IPsec stream is already populated in the whitelist table. As can be seen from FIGS. 7A and 7B, by using the whitelist table, the processing flow 702 which represents dominant scenarios has lesser steps than the processing flow 701 and leads to much faster packet processing.

Figure 7C:
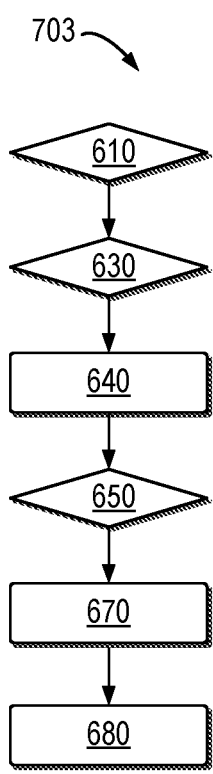
FIG. 7C illustrates a block diagram of a processing flow for a packet of a new non-IPsec stream according to some example embodiments of the present disclosure.
Figure 7D:
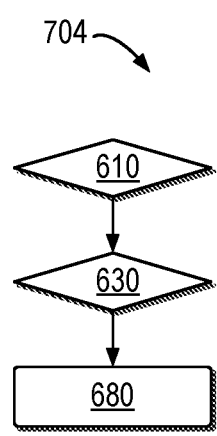
FIG. 7D illustrates a block diagram of a processing flow for a packet of a pre-processed non-IPsec stream according to some example embodiments of the present disclosure.

FIG. 7C illustrates a block diagram of a processing flow 703 for a packet of a new non-IPsec stream. The processing flow 703 occurs in the case where a new non-IPsec stream enters the apparatus 400 and needs to be learnt by the primer module 420. FIG. 7D illustrates a block diagram of a processing flow 704 for a packet of a pre-processed non-IPsec stream. The processing flow 704 occurs in the case where the information for the non-IPsec stream is already populated in the backlist table. As can be seen from FIGS. 7C and 7D, by using the backlist table, packets of a non-IPsec stream can be quickly identified and processing load can be further reduced.

Some tests have been carried out to compare the RtC with Locking approach and the proposed solution. Table 2 shows the test results for the case of sequence number generation (encryption). Table 3 shows the test results for the case of ARW processing (decryption). Both Tables 2 and 3 show the maximum number of packets achieved without drops against the total number of cores used in the pool of processing cores.

TABLE 2 test results for the case of sequence number generation

| No. of CPU Cores used | Achieved IPsec Encryption for RtC with Locking approach. (Million Packets Per Second) | Achieved IPsec Encryption for the Proposed solution. (Million Packets Per Second) | Improvement achieved with the proposed solution |
|---|---|---|---|
| 1 | 1.3 | 1.4 | 8% |
| 2 | 2.2 | 2.6 | 16% |
| 3 | 3.0 | 3.7 | 19% |
| 4 | 3.3 | 4.5 | 36% |

Figure 8:
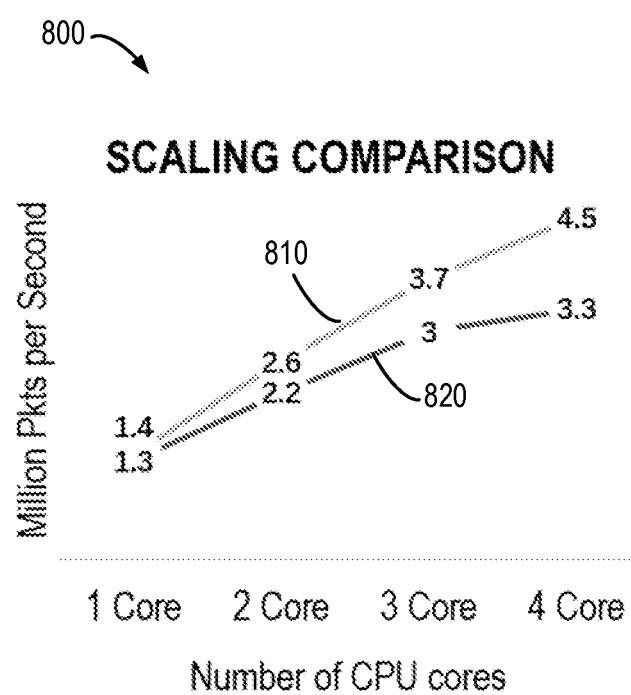
FIG. 8 illustrates a plot showing throughputs in the case of sequence number generation.

FIG. 8 illustrates a plot 800 showing throughputs in the case of sequence number generation which corresponds to Table 2. In the plot 800, the curve 810 shows the throughputs for the RtC with Locking approach and the curve 820 shows the throughputs for the proposed solution.

TABLE 3 test results for the case of ARW processing

| No. of CPU Cores used | Achieved IPsec Decryption For RtC with Locking approach. (Million Packets Per Second) | achieved IPsec Decryption for the Proposed solution. (Million Packets Per Second) | Improvement achieved with proposed solution |
| --- | --- | --- | --- |
| 1 | 1.8 | 2.0 | 10% |
| 2 | 2.4 | 3.5 | 45% |
| 3 | 2.7 | 4.9 | 81% |

As can be seen from the results in Table 2, Table 3 and FIG. 8, the RtC with Locking approach exhibits a clear decrement in scalability with the increase of the number of cores used. This is because of exponential increase in contention for locks with more cores, resulting in decrease in overall benefit of adding in cores. In contrast, the results from the proposed solution exhibit a linearly scaled increase in packet processing throughput in proportion with an addition of cores. Furthermore, the tables also show the achieved percentage of improvement using the proposed solution. The proposed solution outperforms and achieves both desired goals of high performance and scalability.

As can be seen from the foregoing, according to the example embodiments of the present disclosure, linear increase in the throughput proportional to the number of additional cores can be achieved. For a fixed number of cores, the example embodiments of the present disclosure can produce significant increase in overall throughput as seen in the Table 2, Table 3 and FIG. 8. By eliminating the need for synchronization between the parallel processing cores, the example embodiments of the present disclosure create truly independent parallel processing cores, thus improving throughput as compared to the conventional solutions. Moreover, since the example embodiments of the present disclosure are standard complaint to existing RFCs and do not introduce any new parameters to external interfaces, it can work with all off-the-shelf standard compliant products without any additional modifications at either end.

Example Embodiments and Device

In some example embodiments, an apparatus capable of performing the method 500 may comprise means for performing the respective steps of the method 500. The means may be implemented in any suitable form. For example, the means may be implemented in a circuitry or software module.

In some example embodiments, the apparatus capable of performing the method 500 comprises: means for determining a security association for an incoming stream, the incoming streaming comprising a plurality of packets; means for performing pre-processing on the plurality of packets based on the security association; and means for in response to the pre-processing being performed on at least one of the plurality of packets, performing parallel processing on the at least one of the plurality of packets.

In some example embodiments, the means for determining the security association for the incoming stream comprises: means for in response to receiving a first packet of the incoming stream, determining, based on the first packet, whether the incoming stream is mapped to at least one predetermined security association indicated in a first table, the first table storing mapping information between an Internet Protocol Security, IPsec, stream and a predetermined security association; and means for in accordance with a determination that the incoming stream is mapped to the at least one predetermined security association, determining the security association from the at least one predetermined security association.

In some example embodiments, the apparatus capable of performing the method 500 further comprises: means for in accordance with a determination that the incoming stream is not mapped to any predetermined security association indicated in the first table, determining whether the incoming stream is an IPsec stream; and means for in accordance with a determination that the incoming stream is the IPsec stream, determining the security association based on a predetermined security association established for the IPsec stream.

In some example embodiments, the apparatus capable of performing the method 500 further comprises: means for updating the first table to store mapping information between the incoming stream and the security association.

In some example embodiments, the means for determining whether the incoming stream is an IPsec stream comprises: means for determining, based on the first packet, whether the incoming stream matches an entry of a second table, an entry of the second table indicating a non-IPsec streams; means for in accordance with a determination that the incoming stream matches no entry of the second table, performing Layer 2 and Layer 3 processing on the first packet to determine whether the first packet is mapped to an inbound stream or an outbound stream; and means for in accordance with a determination that the first packet is mapped to an inbound stream or an outbound stream, determining that the incoming stream is the IPsec stream.

In some example embodiments, the apparatus capable of performing the method 500 further comprises: means for in response to receiving a second packet of a further incoming stream, determining whether the further incoming stream matches an entry of the second table based on the second packet; means for in accordance with a determination that the further incoming stream matches no entry of the second table, performing Layer 2 and Layer 3 processing on the second packet to determine whether the second packet is mapped to an inbound stream or an outbound stream; and means for in accordance with a determination that the second packet is neither mapped to an inbound stream nor an outbound stream, updating the second table to indicate the further incoming stream.

In some example embodiments, the means for performing the pre-processing on the plurality of packets based on the security association comprises: means for determining whether a third packet of the plurality of packets is an outbound packet; and means for in accordance with a determination that the third packet is the outbound packet, assigning a sequence number to the third packet based on a sequence number counter of the security association.

In some example embodiments, the means for assigning the sequence number to the third packet based on the sequence number counter of the security association comprises: means for determining the number of fragments into which the third packet is to be divided, based on a size of the third packet, a packet size available for transmission and the security association; and means for determining the sequence number by increasing a value of the sequence number counter by the number of the fragments.

In some example embodiments, the means for performing the pre-processing on the plurality of packets based on the security association comprises: means for determining whether a fourth packet of the plurality of packets is an inbound packet; means for in accordance with a determination that the fourth packet is the inbound packet, verifying whether the sequence number of the fourth packet falls within an anti-replay window of the security association; and means for including a result of the verification in the fourth packet.

In some example embodiments, the apparatus capable of performing the method 500 further comprises: means for updating the anti-replay window of the security association based on a feedback of the parallel processing.

Figure 9:
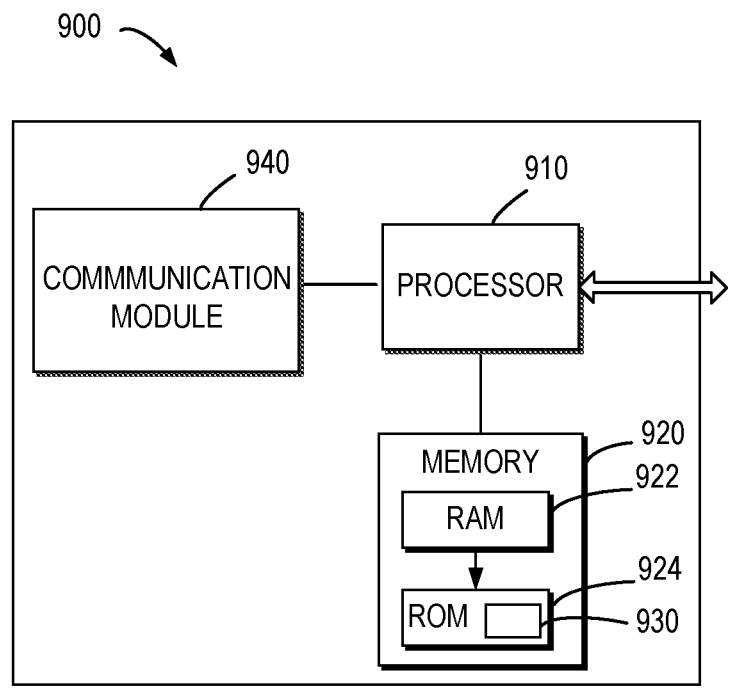
FIG. 9 illustrates a simplified block diagram of a device that is suitable for implementing embodiments of the present disclosure.

FIG. 9 is a simplified block diagram of a device 900 that is suitable for implementing embodiments of the present disclosure. The device 900 may be provided to implement the apparatus 400. As shown, the device 900 includes one or more processors 910, one or more memories 920 coupled to the processor 910, and one or more communication modules 940 coupled to the processor 910.

The communication module 940 is for bidirectional communications. The communication module 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 920. The processor 910 may perform any suitable actions and processing by loading the program 930 into the RAM 920.

The embodiments of the present disclosure may be implemented by means of the program 930 so that the device 900 may perform any process of the disclosure as discussed with reference to FIGS. 5 to 6. The embodiments of the present disclosure may also be implemented by hardware or by a combination of software and hardware.

Figure 10:
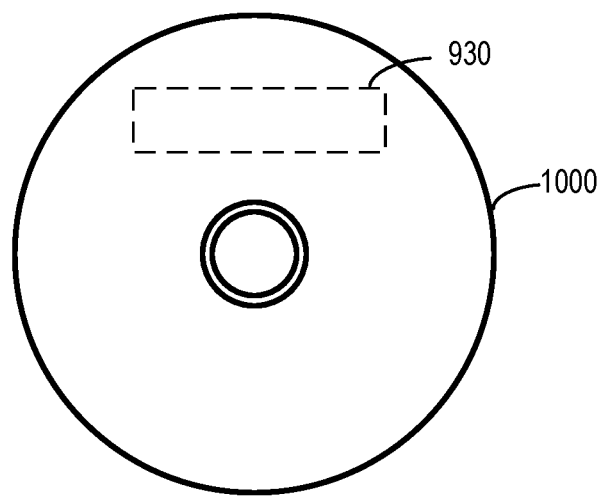
FIG. 10 illustrates a block diagram of an example computer readable medium in accordance with some example embodiments of the present disclosure.

In some embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 930 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 900 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the device 900 may be instead comprised in the distributed unit, and at least some of the described processes may be performed by the distributed unit.

In an embodiment, the execution of at least some of the functionalities of the device 900 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 900 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500 or 600 as described above with reference to FIGS. 5-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:
    at least one processor; and
    at least one memory including computer program codes;
        the at least one memory and the computer program codes are configured to, with the at least one processor, cause the apparatus to:
    determine a security association for an incoming stream, the incoming streaming comprising a plurality of packets, including:
        in response to receiving a first packet of the incoming stream, determine, based on the first packet, whether the incoming stream is mapped to at least one predetermined security association indicated in a first table, the first table storing mapping information between an Internet Protocol Security, IPsec, stream and a predetermined security association,
        in accordance with a determination that the incoming stream is mapped to the at least one predetermined security association, determine the security association from the at least one predetermined security association,
        in accordance with a determination that the incoming stream is not mapped to any predetermined security association indicated in the first table, determine whether the incoming stream is an IPsec stream, and
        in accordance with a determination that the incoming stream is the IPsec stream, determine the security association based on a predetermined security association established for the IPsec stream;
    perform pre-processing on the plurality of packets based on the security association; and
    in response to the pre-processing being performed on at least one of the plurality of packets, perform parallel processing on the at least one of the plurality of packets.

2. The apparatus of claim 1, wherein the apparatus is further caused to:
    update the first table to store mapping information between the incoming stream and the security association.

3. The apparatus of claim 1, wherein the apparatus is further caused to:
    determine, based on the first packet, whether the incoming stream matches an entry of a second table, an entry of the second table indicating a non-IPsec streams;
    in accordance with a determination that the incoming stream matches no entry of the second table, perform Layer 2 and Layer 3 processing on the first packet to determine whether the first packet is mapped to an inbound stream or an outbound stream; and
    in accordance with a determination that the first packet is mapped to an inbound stream or an outbound stream, determine that the incoming stream is the IPsec stream.

4. The apparatus of claim 3, wherein the apparatus is further caused to:
  in response to receiving a second packet of a further incoming stream, determine whether the further incoming stream matches an entry of the second table based on the second packet;
  in accordance with a determination that the further incoming stream matches no entry of the second table, perform Layer 2 and Layer 3 processing on the second packet to determine whether the second packet is mapped to an inbound stream or an outbound stream; and
  in accordance with a determination that the second packet is neither mapped to an inbound stream nor an outbound stream, update the second table to indicate the further incoming stream.

5. The apparatus of claim 1, wherein the apparatus is further caused to:
  determine whether a third packet of the plurality of packets is an outbound packet; and
  in accordance with a determination that the third packet is the outbound packet, assign a sequence number to the third packet based on a sequence number counter of the security association.

6. The apparatus of claim 5, wherein the apparatus is further caused to:
  determine the number of fragments into which the third packet is to be divided, based on a size of the third packet, a packet size available for transmission and the security association; and
  determine the sequence number by increasing a value of the sequence number counter by the number of the fragments.

7. The apparatus of claim 1, wherein the apparatus is further caused to:
  determine whether a fourth packet of the plurality of packets is an inbound packet;
  in accordance with a determination that the fourth packet is the inbound packet, verify whether the sequence number of the fourth packet falls within an anti-replay window of the security association; and
  include a result of the verification in the fourth packet.

8. The apparatus of claim 7, wherein the apparatus is further caused to:
  update the anti-replay window of the security association based on a feedback of the parallel processing.

9. A method comprising:
  determining a security association for an incoming stream, the incoming streaming comprising a plurality of packets, including:
    in response to receiving a first packet of the incoming stream, determine, based on the first packet, whether the incoming stream is mapped to at least one predetermined security association indicated in a first table, the first table storing mapping information between an Internet Protocol Security, IPsec, stream and a predetermined security association,
    in accordance with a determination that the incoming stream is mapped to the at least one predetermined security association, determine the security association from the at least one predetermined security association,
    in accordance with a determination that the incoming stream is not mapped to any predetermined security association indicated in the first table, determine whether the incoming stream is an IPsec stream, and
    in accordance with a determination that the incoming stream is the IPsec stream, determine the security association based on a predetermined security association established for the IPsec stream;
  performing pre-processing on the plurality of packets based on the security association; and
  in response to the pre-processing being performed on at least one of the plurality of packets, performing parallel processing on the at least one of the plurality of packets.

10. The method of claim 9, further comprising:
  updating the first table to store mapping information between the incoming stream and the security association.

11. The method of claim 9, wherein determining whether the incoming stream is an IPsec stream comprises:
  determining, based on the first packet, whether the incoming stream matches an entry of a second table, an entry of the second table indicating a non-IPsec streams;
  in accordance with a determination that the incoming stream matches no entry of the second table, performing Layer 2 and Layer 3 processing on the first packet to determine whether the first packet is mapped to an inbound stream or an outbound stream; and
  in accordance with a determination that the first packet is mapped to an inbound stream or an outbound stream, determining that the incoming stream is the IPsec stream.

12. The method of claim 11, further comprising:
  in response to receiving a second packet of a further incoming stream, determining whether the further incoming stream matches an entry of the second table based on the second packet;
  in accordance with a determination that the further incoming stream matches no entry of the second table, performing Layer 2 and Layer 3 processing on the second packet to determine whether the second packet is mapped to an inbound stream or an outbound stream; and
  in accordance with a determination that the second packet is neither mapped to an inbound stream nor an outbound stream, updating the second table to indicate the further incoming stream.

13. The method of claim 9, wherein performing the pre-processing on the plurality of packets based on the security association comprises:
  determining whether a third packet of the plurality of packets is an outbound packet; and
  in accordance with a determination that the third packet is the outbound packet, assigning a sequence number to the third packet based on a sequence number counter of the security association.

14. The method of claim 13, wherein assigning the sequence number to the third packet based on the sequence number counter of the security association comprises:
  determining the number of fragments into which the third packet is to be divided, based on a size of the third packet, a packet size available for transmission and the security association; and
  determining the sequence number by increasing a value of the sequence number counter by the number of the fragments.

15. The method of claim 9, wherein performing the pre-processing on the plurality of packets based on the security association comprises:
  determining whether a fourth packet of the plurality of packets is an inbound packet; in accordance with a determination that the fourth packet is the inbound packet, verifying whether the sequence number of the fourth packet falls within an anti-replay window of the security association; and including a result of the verification in the fourth packet.

16. The method of claim 15, further comprising:

updating the anti-replay window of the security association based on a feedback of the parallel processing.

17. A non-transitory computer readable storage-medium comprising program instructions stored thereon, the instructions, when executed by an apparatus, causing the apparatus to:

determine a security association for an incoming stream, the incoming streaming comprising a plurality of packets, including:
in response to receiving a first packet of the incoming stream, determine, based on the first packet, whether the incoming stream is mapped to at least one predetermined security association indicated in a first table, the first table storing mapping information between an Internet Protocol Security, IPsec, stream and a predetermined security association, in accordance with a determination that the incoming stream is mapped to the at least one predetermined security association, determine the security association from the at least one predetermined security association, in accordance with a determination that the incoming stream is not mapped to any predetermined security association indicated in the first table, determine whether the incoming stream is an IPsec stream, and in accordance with a determination that the incoming stream is the IPsec stream, determine the security association based on a predetermined security association established for the IPsec stream;

perform pre-processing on the plurality of packets based on the security association; and in response to the pre-processing being performed on at least one of the plurality of packets, perform parallel processing on the at least one of the plurality of packets.

* * * * *